United States Patent
Tinkler et al.

(10) Patent No.: US 8,609,170 B2
(45) Date of Patent: Dec. 17, 2013

(54) METHOD FOR BEVERAGE FORMATION WITH AUTOMATED WATER DELIVERY TO HEATING TANK

(71) Applicant: Keurig, Incorporated, Reading, MA (US)

(72) Inventors: Ian Tinkler, Wakefield, MA (US); Mary Carter, Boston, MA (US); William Sawyer, Ashland, MA (US); Richard Pasquini, Alfred, MA (US)

(73) Assignee: Keurig, Incorporated, Reading, MA (US)

( * ) Notice: Subject to any disclaimer, the term of this patent is extended or adjusted under 35 U.S.C. 154(b) by 0 days.

(21) Appl. No.: 13/870,630

(22) Filed: Apr. 25, 2013

(65) Prior Publication Data

US 2013/0236618 A1    Sep. 12, 2013

Related U.S. Application Data

(62) Division of application No. 12/704,831, filed on Feb. 12, 2010, now Pat. No. 8,495,949.

(51) Int. Cl.
*A23F 5/26* (2006.01)

(52) U.S. Cl.
USPC ............ 426/431; 426/432; 426/433; 426/435

(58) Field of Classification Search
USPC .................................. 426/431, 432, 433, 435
See application file for complete search history.

(56) References Cited

U.S. PATENT DOCUMENTS

| | | | |
|---|---|---|---|
| 2,169,852 A | 8/1939 | Scott | |
| 2,895,402 A | 7/1959 | Totten | |
| 3,222,500 A | 12/1965 | Small | |
| 3,374,727 A | 3/1968 | Wright | |
| 4,353,293 A * | 10/1982 | Illy | 99/283 |
| 4,484,515 A * | 11/1984 | Illy | 99/282 |
| 4,621,571 A | 11/1986 | Roberts | |
| 6,142,063 A | 11/2000 | Beaulieu et al. | |
| 6,499,388 B2 * | 12/2002 | Schmed | 99/295 |
| 6,619,188 B1 * | 9/2003 | Meador | 99/295 |
| 6,655,260 B2 * | 12/2003 | Lazaris et al. | 99/295 |
| 6,658,989 B2 * | 12/2003 | Sweeney et al. | 99/315 |
| 6,666,130 B2 | 12/2003 | Taylor et al. | |
| 6,672,200 B2 | 1/2004 | Duffy et al. | |
| 6,904,840 B1 * | 6/2005 | Pfeifer et al. | 99/295 |
| 6,948,421 B2 * | 9/2005 | Meador | 99/300 |
| 6,990,891 B2 | 1/2006 | Tebo, Jr. | |
| 7,093,533 B2 | 8/2006 | Tebo et al. | |
| 7,131,369 B2 * | 11/2006 | Gantt et al. | 99/289 R |
| 7,213,505 B2 | 5/2007 | Kollep | |
| 7,325,479 B2 * | 2/2008 | Laigneau et al. | 99/295 |
| 7,398,726 B2 | 7/2008 | Streeter et al. | |
| 7,444,924 B2 * | 11/2008 | Laigneau et al. | 99/280 |
| 7,487,712 B2 * | 2/2009 | Bowden et al. | 99/295 |

(Continued)

*Primary Examiner* — Anthony Weier
(74) *Attorney, Agent, or Firm* — Wolf, Greenfield & Sacks, P.C.

(57) ABSTRACT

A method and apparatus for forming a beverage using a beverage formation device. Opening of a brew chamber may automatically enable the provision of beverage precursor liquid from a reservoir to a heating tank that is used (heated or not) to form a beverage. For example, opening of the brew chamber may cause a valve to be opened or otherwise permit flow of beverage precursor liquid from the reservoir to the heating tank. The valve may open simultaneously and automatically with a brew chamber lid, and may close when the brew chamber lid is closed.

8 Claims, 6 Drawing Sheets

(56) References Cited

U.S. PATENT DOCUMENTS

| | | |
|---|---|---|
| 7,503,253 B2 | 3/2009 | Rahn |
| 7,543,526 B1 * | 6/2009 | Tai .................................. 99/284 |
| 7,571,674 B2 | 8/2009 | Wang |
| 7,698,992 B2 * | 4/2010 | Wei ................................. 99/281 |
| 7,845,270 B2 * | 12/2010 | Rahn et al. .................. 99/289 R |
| 8,033,211 B2 * | 10/2011 | Halliday et al. ................ 99/295 |
| 8,069,775 B2 | 12/2011 | Russo |
| 8,087,347 B2 * | 1/2012 | Halliday et al. ................ 99/295 |
| 8,367,136 B2 * | 2/2013 | Doglioni Majer ............ 426/431 |
| 8,495,949 B2 * | 7/2013 | Tinkler et al. .................. 99/285 |
| 8,516,948 B2 * | 8/2013 | Zimmerman et al. .......... 99/295 |
| 2004/0244599 A1 * | 12/2004 | Wei ................................. 99/279 |
| 2005/0034605 A1 * | 2/2005 | Webster et al. ................. 99/279 |
| 2006/0021515 A1 * | 2/2006 | Graviss et al. .................. 99/279 |
| 2007/0181004 A1 * | 8/2007 | Hale ............................... 99/279 |
| 2007/0295220 A1 * | 12/2007 | Webster et al. ................. 99/290 |
| 2008/0095904 A1 | 4/2008 | Sullivan et al. |
| 2008/0115674 A1 * | 5/2008 | Huang et al. .................... 99/279 |
| 2008/0134902 A1 * | 6/2008 | Zimmerman et al. ...... 99/302 R |
| 2009/0007792 A1 | 1/2009 | Glucksman et al. |
| 2010/0162900 A1 | 7/2010 | Westra |
| 2012/0201876 A1 | 8/2012 | Bhaskaran et al. |
| 2013/0129886 A1 * | 5/2013 | Quinn et al. .................. 426/431 |

* cited by examiner

METHOD FOR BEVERAGE FORMATION WITH AUTOMATED WATER DELIVERY TO HEATING TANK

RELATED APPLICATIONS

This Application is a Divisional of and claims the benefit under 35 U.S.C. §121 of U.S. application Ser. No. 12/704831, entitled "APPARATUS FOR BEVERAGE FORMATION WITH AUTOMATED WATER DELIVERY TO HEATING TANK" filed Feb. 12, 2010, now U.S. Pat. No. 8,495,949 which is herein incorporated by reference in its entirety.

BACKGROUND

Some types of beverage forming devices, such as coffee brewers, use a cartridge containing a beverage medium, e.g., ground coffee, to form a beverage. In coffee brewers of this type, water is heated by the brewer and introduced into the cartridge. The water infuses with the coffee in the cartridge, and the beverage formed is removed from the cartridge for consumption. Many coffee brewers of this type commonly require a user to provide water to the machine that is used to form the beverage.

SUMMARY OF INVENTION

The inventors have appreciated that in some applications, users of a beverage forming device, such as a coffee brewer, may wish to control precisely how much and what type of liquid (e.g., 9 ounces of bottled water) is used to make a particular beverage. For example, with brewers used by hotel guests in their room, the guests may wish to have a specific type and/or volume of water be used to make a beverage. Some single cup coffee makers provide for a choice of two or more specific volumes, such as 8 or 10 ounces, but a guest may wish to use another volume, such as 7 ounces. Alternately, or in addition, the guest may wish to use a specific type of water to make the coffee. Thus, a guest may wish to ensure that the brewer is completely empty of water or other liquid before starting a beverage-making operation so that she can define the volume and type of liquid used. Also, it may be preferable to maintain the brewer empty of water between uses even if specific volume control is not a consideration, e.g., because several hours or days may pass between uses of the brewer, resulting in stale water being left in the brewer. Requiring a user to provide fresh water at the time of use may help to provide a higher quality beverage.

One aspect of the invention relates to a method of beverage device operation. The beverage formation device may include a brew chamber for receiving a beverage cartridge, a reservoir for holding beverage precursor liquid used to make the beverage and a heater tank for heating the beverage precursor liquid. Beverage precursor liquid (e.g., water) may be provided into the reservoir, e.g., by opening a reservoir lid that allows access for a user to pour the liquid into the reservoir. Before pouring the liquid into the reservoir, the user may be able to see that the reservoir is completely empty, helping to ensure the volume of liquid used to make the beverage. After providing liquid into the reservoir, the brew chamber of the brewer may be opened, e.g., by lifting a brew chamber lid, to expose a cartridge receiver that receives a beverage cartridge. In response to opening of the brew chamber, a valve may automatically open to permit beverage precursor liquid to flow from the reservoir into the heating tank. For example, the reservoir may be positioned over the heating tank, and when the valve is opened, the liquid may flow under the force of gravity into the heating tank. Simultaneously, a beverage cartridge may be placed in the cartridge receiver, and the brew chamber closed to at least partially enclose the beverage cartridge in the brew chamber. In response to closing the brew chamber, the valve may be automatically closed to stop the flow of beverage precursor liquid from the reservoir to the heating tank. As a result, all of the water or other liquid provided into the reservoir may be delivered to the heating tank by the simple operation of opening the brew chamber. Such a feature may be useful in certain embodiments, such as brewers arranged to form one cup of beverage at a time, and thus requiring water and a new cartridge to be provided for each brew cycle.

In another aspect of the invention, a beverage formation device may include a brew chamber for receiving a beverage cartridge and have a lid that is movable between open and closed positions to open and close the brew chamber. The brew chamber may be adapted to substantially enclose a beverage cartridge with the lid in a closed position, e.g., so that liquid may be introduced into the cartridge to form a beverage. A reservoir may hold a beverage precursor liquid, e.g., that is provided by a user pouring the liquid into the reservoir via a reservoir access. Liquid in the reservoir may be provided to a heater tank which heats liquid delivered to the brew chamber for forming a beverage. A valve in the flow path between the reservoir and the heater tank may open to allow flow of liquid from the reservoir to the heating tank when the brew chamber lid is open, and may close the flow path when the brew chamber lid is closed. In one embodiment, the valve may include a gate that is attached to the brew chamber lid and moves between open and closed positions as the brew chamber lid moves between open and closed positions. A user need not take any particular steps to deliver the precursor liquid to the heater tank other than opening a brew chamber lid, i.e., an action that must be done with some devices that require a beverage cartridge to form a beverage.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

Figure 1:
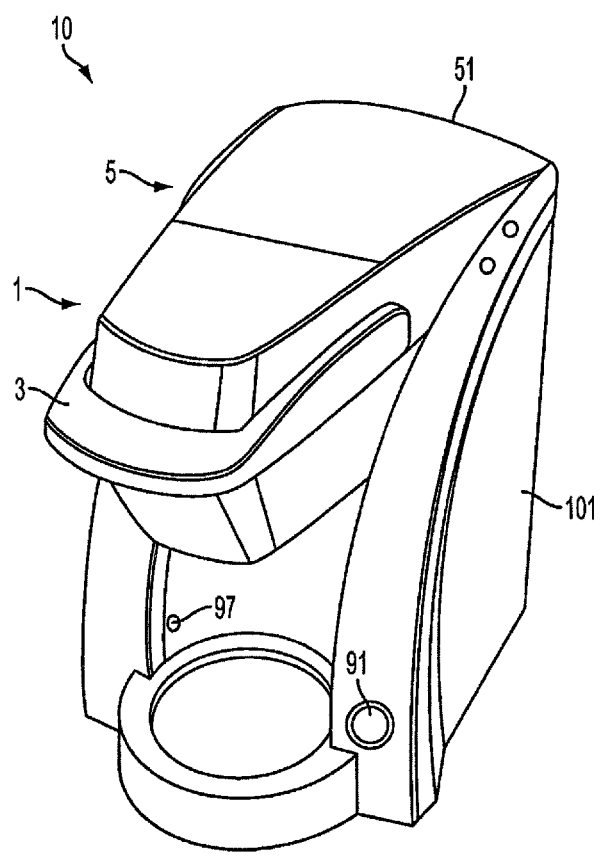
FIG. 1 is a perspective view of a beverage formation device in accordance with aspects of the invention.

Various aspects of the invention are described below and/or shown in the drawings. These aspects of the invention may be used alone and/or in any suitable combination with each other. Aspects of the invention are not limited in any way by the illustrative embodiments shown and described herein.

As used herein, a "cartridge" may take any suitable form, such as a pod (e.g., opposed layers of filter paper encapsulating a beverage medium), capsule, sachet or any other arrangement. The cartridge may be impervious to air and/or liquid, or may allow water and/or air to pass into the cartridge. The cartridge may include a beverage medium, such as tea, ground coffee, powdered milk, a drink mix, and/or any other suitable material for forming a beverage. The cartridge may include a filter or other arrangement to help prevent some portions of the beverage medium from being provided with the formed beverage, such as a coffee drink, tea, hot chocolate, etc. To "brew" a beverage as used herein includes infusion, mixing, dissolving, steeping or otherwise forming a drinkable substance using water or other beverage precursor (e.g., flavored or otherwise treated water, or other liquid whether heated or not) with a beverage medium. Also, reference to "water" herein is to any suitable water formulation, e.g., filtered, deionized, softened, etc., as well as any other suitable precursor liquid used to form a beverage, such as sweetened or flavored water, milk, etc.

FIG. 1 shows a beverage forming device 10 that incorporates various aspects of the invention. This illustrative embodiment includes a housing 101 that encloses various parts of the device 10 and supports several external features, such as a power button 91, a cup sensor 97 (e.g., a photosensor) and/or other optional features. A brew chamber 1 may be opened, e.g., by lifting a handle 3, so that a beverage cartridge may be inserted into the brew chamber 1 for forming a beverage. In this regard, the device 10 may operate, for example, as shown in U.S. Pat. No. 7,165,488, which is hereby incorporated by reference. That is, lifting the handle 3 may cause a brew chamber lid (not shown in FIG. 1) to be raised so that a cartridge receiver may tilt forward to receive a beverage cartridge. Of course, it should be understood that the brew chamber 1 may be opened in other ways, such as by push button actuation of a motor-driven mechanism, manual opening of a drawer that slides linearly outwardly to receive a cartridge, and so on.

In one aspect of the invention, the device 10 may automatically enable provision of water or other precursor liquid used to form a beverage into a heating tank in response to opening of the brew chamber 1. For example, a user may move a reservoir lid 51 of a reservoir 5 from the closed position in FIG. 1 to the open position shown in FIG. 2. With the reservoir lid 51 in the open position, the reservoir 5 is exposed, allowing the user to provide water or other precursor liquid (such as a sweetened water, milk, etc.) into the reservoir 5. A level indicator 52, such as two or more markings on the sidewall of the reservoir 5 may provide a visual indication to the user regarding a volume of liquid in the reservoir 5. Other arrangements for the level indicator 52 are also possible, such as electronic displays, capacitive, conductive and/or other electronic liquid level measuring arrangements, and so on. For example, the level indicator 52 could include one or more conductive probes that measure a resistance level in the reservoir 5 which varies based on the volume of liquid in the reservoir 5. The level indicator 52 could use the measured resistance to control a display (e.g., an LCD) that indicates a corresponding volume in the reservoir 5.

Figure 2:
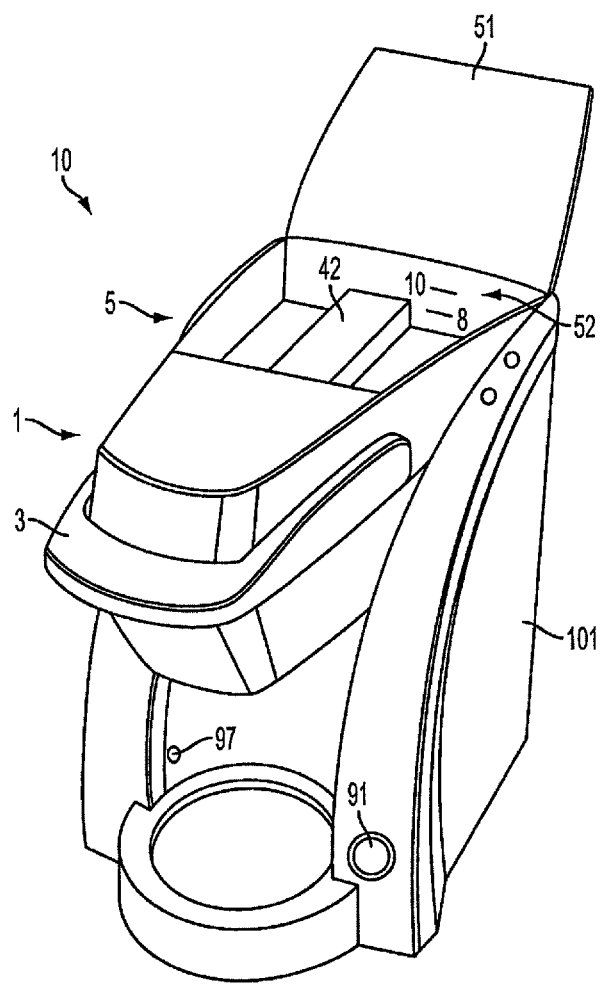
FIG. 2 is a perspective view of the beverage formation device of FIG. 1 with a reservoir lid in an open position.
Figure 3:
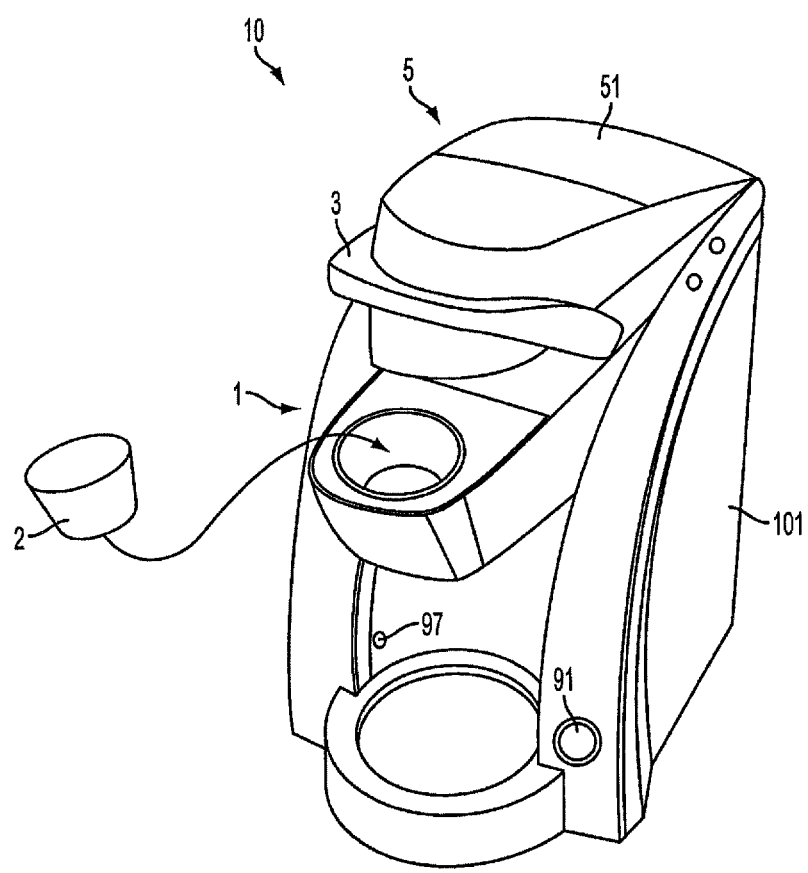
FIG. 3 is a perspective view of the beverage formation device of FIG. 1 with a brew chamber in an open position.

With water in the reservoir 5, the user could lift the handle 3 or otherwise cause the brew chamber 1 to open to allow placement of a fresh cartridge 2 in the brew chamber 1, as shown in FIG. 3. Although FIG. 3 shows that the brew chamber 1 is opened with the reservoir lid 51 in a closed position, the brew chamber 1 could be opened with the reservoir lid 51 in an open position. In accordance with an aspect of the invention, when the brew chamber 1 is opened, a flow path between the reservoir 5 and a heater tank (not shown in FIGS. 1-3) is opened so that liquid in the reservoir 5 can flow into the heater tank. In one embodiment, opening of the brew chamber 1 opens a valve, which allows liquid in the reservoir 5 to flow into the heater tank. Thus, in this embodiment, water in the reservoir 5 is automatically delivered to the heater tank in response to opening of a brew chamber, e.g., to place a new cartridge for beverage creation.

After placement of the fresh cartridge 2 in the brew chamber and liquid in the reservoir 5 is delivered to the heater tank, the user may cause the brew chamber 1 to close, e.g., by pressing down on the handle 3, pushing a control button that actuates a motor drive to close the brew chamber 1, etc. Closing of the brew chamber 1 may cause the device 10 to begin a brew cycle, e.g., heating of the liquid in the heater tank may be started, and heated liquid delivered to the cartridge to make a beverage. Of course, the start of a brew cycle may be initiated in other ways, such as by a user pushing a button, placing a cup under the brew chamber 1, detection of a suitable amount of water in the heater tank, and so on.

Although provision of water or other precursor liquid into the reservoir 5 is made by a user pouring the water into the reservoir 5, provision of water or other liquid to the reservoir 5 may occur in other ways, and a user need not provide the liquid into the reservoir 5. For example, liquid may be provided to the reservoir 5 in response to brew chamber 1 closing, e.g., a water supply line that feeds the reservoir 5 may be controlled to deliver water to the reservoir 5 when the brew chamber 1 is closed. Thus, when the brew chamber is next opened, the liquid in the reservoir 5 may be delivered to the heater tank, and the reservoir 5 again refilled when the brew chamber is closed. The water supply line may run from a plumbed connection to a domestic water supply, for example, and a float valve or other arrangement may stop water supply to the reservoir 5 when a desired volume is present in the reservoir 5. In one embodiment, an electronically-controlled valve in the plumbed connection may be closed when the level indicator 52 detects a particular volume of water in the reservoir 5. Further, a user may define the desired liquid volume to be provided to the reservoir 5, such as by setting a selector switch, pressing a button corresponding to a desired volume and so on In such embodiments, a lid 51 for the reservoir 5 need not be provided since a user need not have access to the reservoir 5. However, in the embodiment shown in FIGS. 1-3, the reservoir 5 receives water or other liquid by a user pouring the liquid through an access opening exposed by opening of the reservoir lid 51. In accordance with this embodiment, a user may visually confirm that the device 10 is effectively empty of water between uses, and have fresh water provided to the brewer prior to each brew cycle.

In another aspect of the invention, the brew chamber 1 may open simultaneously with closing of the reservoir lid 51. That is, closing of the reservoir lid 51 may signal that the user has provided water into the reservoir 5, and is now ready to provide a fresh cartridge 2 into the brew chamber 1. Simultaneous and automatic opening of the brew chamber 1 with closure of the reservoir lid 51 may be controlled by a lid control mechanism, e.g., that unlatches the brew chamber from a locked closed position allowing the brew chamber to open under a spring bias. Other arrangements for the lid control mechanism are possible, such as a motor-driven linkage that operates to open the brew chamber 1 in response to a user's closure of the reservoir lid 51, mechanical or electromechanical latching devices that unlatch the brew chamber 1 allowing the brew chamber to open under a spring bias, and others.

Figure 4:
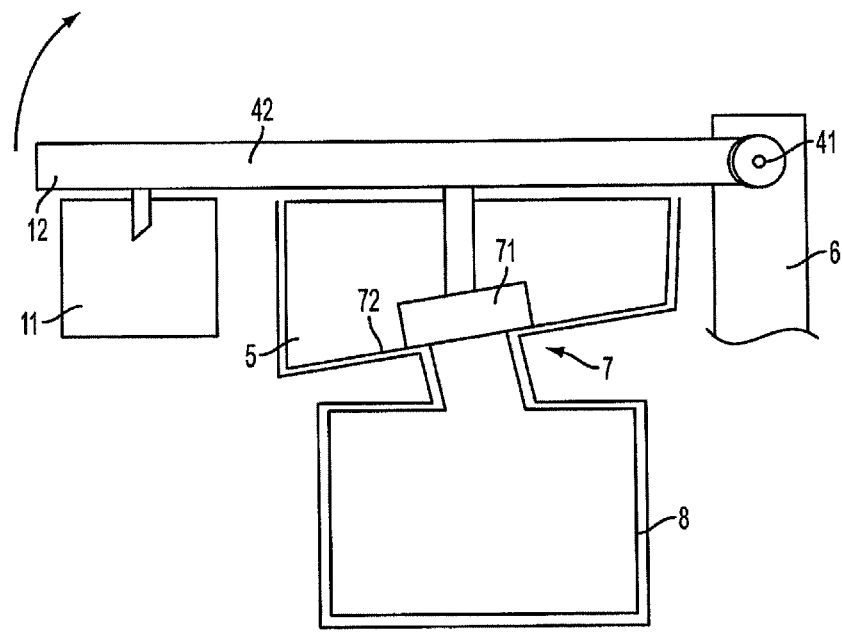
FIGS. 4 and 5 show a schematic view of portions of the of the beverage formation device in various states of opening and closing operations.
Figure 5:
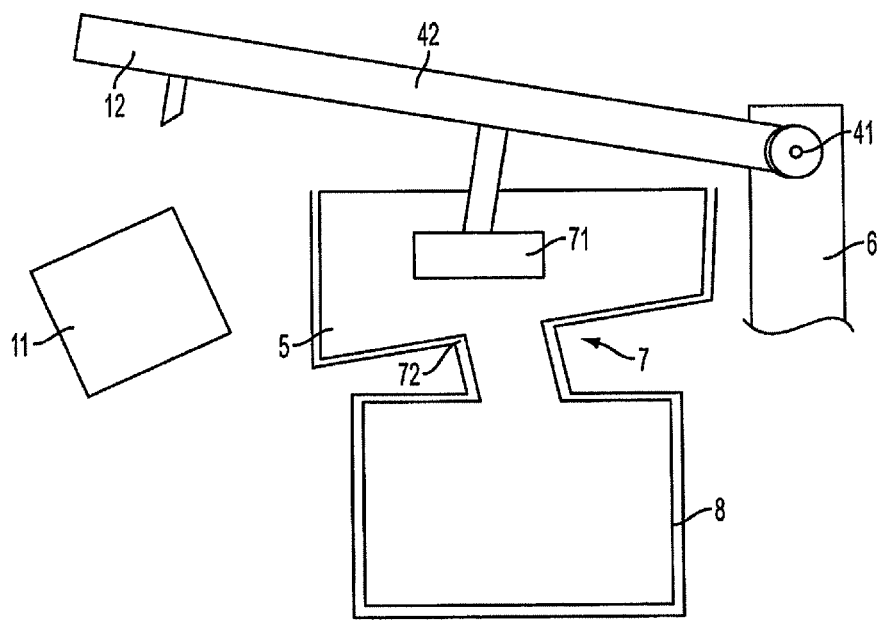

To further illustrate these and other aspects of the invention, FIGS. 4 and 5 show a schematic view of selected components of the device 10 shown in FIGS. 1-3 with the housing 101 removed. Although reference is made to FIGS. 4 and 5 to illustrate aspects of the invention, no limitation on such aspects of the invention is intended. For example, arrangements are described for movement of a brew chamber lid and a reservoir lid 51, but aspects of the invention are not limited to the embodiments described, e.g., neither the brew chamber 1 nor the reservoir 5 need have a lid in some aspects of the invention. Also, it should be understood that the device 10 likely would include other parts that are not shown here for purposes of clarity.

In the illustrative embodiment shown, an arm 42 is pivotally mounted to a frame 6 of the device 10 at an axis 41. Although not shown, the arm 42 may be moved based on movement of the handle 3, which may be fixed to the arm 42 or otherwise coupled to the arm 42 so that movement of the handle 3 causes the arm 42 to pivot about the axis 41. The frame 6 may form a skeleton of the device 10, supporting the housing 101 as well as other components of the device 10. The arm 42 has mounted to it a brew chamber lid 12 that covers an opening in a beverage cartridge receiver 11. The brew chamber lid 12 may be fixed relative to the arm 42, and thus may move to open or close the brew chamber 1 with movement of the arm 42. The brew chamber lid 12 may include a needle or other piercing element that punctures the cartridge 2 when the cartridge is enclosed in the brew chamber. The piercing element may be used to introduce water or other liquid into the cartridge, as is known in the art. Also mounted to the arm 42 is a gate 71 of a valve 7 which controls flow of liquid between the reservoir 5 and the heater tank 8. Thus, in this embodiment, the gate 71 moves to open and close the flow path of the valve 7 between the reservoir 5 and the heater tank 8 with movement of the arm 42.

In this illustrative embodiment, opening of the brew chamber lid 12 from a closed position shown in FIG. 4 is initiated by lifting the handle 3, which causes the arm 42 to rotate clockwise. Rotation of the arm 42 lifts the brew chamber lid 12 away from the cartridge receiver 11, which may tilt forwardly as shown in FIG. 5 to receive a cartridge 2. This movement of the arm 42 also lifts the gate 71 away from a seat 72 of the valve 7, opening the flow path to allow liquid in the reservoir 5 to flow (e.g., under the force of gravity) into the heater tank 8. Accordingly, if there is water present in the reservoir 5 when the brew chamber 1 is opened for placement of a cartridge 2 in the cartridge receiver 11, the valve 7 will open to allow the water to flow into the heater tank 8. Closure of the brew chamber 1 causes the arm 42 to return to the position shown in FIG. 4, which closes the valve 7. The valve 7 may provide a pneumatic seal for the heater tank 8, allowing liquid in the heater tank 8 to be delivered to the brew chamber 1 by introducing air pressure into the heater tank 8, as discussed in more detail below.

As shown in FIGS. 4 and 5, the gate 71 may be arranged at a suitable angle relative to the arm 42 so that the gate 71 properly contacts the seat 72 as the gate 71 moves between open and closed positions along an arcuate path with the arm 42. In another embodiment, the gate 71 may be pivotally mounted to the arm 42 so that the gate 71 may move along a linear path (e.g., along a vertical line), rather than an arcuate one, relative to the seat 72. In some embodiments, the gate 71 may be coupled to the arm 42 by a spring or other resilient element so that a suitable closing force may be applied to the gate 71 when making contact with the seat 72. Alternately, or in addition, a silicone gasket or other element may be positioned between the gate 71 and seat 72 and arranged to form a suitable seal when the gate 71 and seat 72 are moved together. This resilient coupling may help prevent damage of the gate 71 or seat 72, e.g., by limiting the contact force to be under a threshold level, and/or help ensure that suitable contact is made between the gate 71 and seat 72 so that a leak-free seal is formed at the valve 7.

Those of skill in the art will appreciate that the valve 7 may be arranged in other ways. For example, the valve 7 may include a flapper element that is connected by a chain or other link to the arm 42 in much the same way that a common toilet tank flapper valve is connected to a flush handle. Movement of the arm 42 upwardly may lift the flapper element relative to the valve seat, opening the valve for flow. The flapper valve element may return to contact with the valve seat once water has emptied from the reservoir 5. Again like a standard toilet tank flapper valve, the flapper element may have a delay feature such that the flapper element remains in an open position for a period of time even after the arm 42 is moved to a closed position. This delay feature in the valve 7 may help ensure that all liquid in the reservoir 5 is delivered to the heater tank 8 even if the user very quickly opens and closes the brew chamber 1 when placing a cartridge. (By "all liquid" is delivered or the reservoir is "emptied" it is meant that substantially all liquid is delivered from the reservoir 5. Thus, after delivery of "all liquid" or "emptying" of the reservoir 5, there may in fact be some liquid remaining in the reservoir 5.) In another embodiment, a valve gate or other moveable element may be coupled to the arm 42 by a multi-component linkage such that movement of the arm 42 causes the valve 7 to open and close. In other embodiments, movement of the arm 42 may actuate an electric switch, which causes an actuator (such as a motor or solenoid) to open and/or close the valve 7.

Although the arm 42 is shown as moving along an arcuate path to move the brew chamber lid 12 between open and closed positions, the arm 42 may move in other ways, such as with a sliding motion, a non-pivoting up and down motion, etc. In short, aspects of the invention are not limited in the way that the brew chamber is opened/closed and/or the way that the valve is opened or closed. For example, the brew chamber may be opened by sliding a cartridge receiver to an open position. In this embodiment, the brew chamber lid (if even present) need not move at all for opening of the brew chamber. Thus, the brew chamber may open and close in any suitable way to allow a cartridge to be received for beverage formation.

In this embodiment, the reservoir 5 is sized to receive only enough water for the preparation of one serving of beverage (e.g., 6, 8, 10, 12, 16 ounces or more), and the device 10 is operated to empty the reservoir 5 and heating tank 8 during each brew cycle. Thus, the reservoir 5 in this embodiment needs refilling after each completed brew cycle. This embodiment may be useful in certain applications, such as hotel use or other circumstances when it may not be desired to store water in the brewer. Of course, in other embodiments, the reservoir 5 may have a larger capacity, or be provided water from a separate storage tank or a plumbed connection. After water is provided in the reservoir 5, the user may push the reservoir lid 51 down so that it locks in and pneumatically seals the reservoir 5. By a pneumatic seal, it is meant that the lid 51 provides a suitable seal of the reservoir 5 to allow pneumatic delivery of water in the reservoir 5 to the heater tank 8, if desired.

Figure 6:
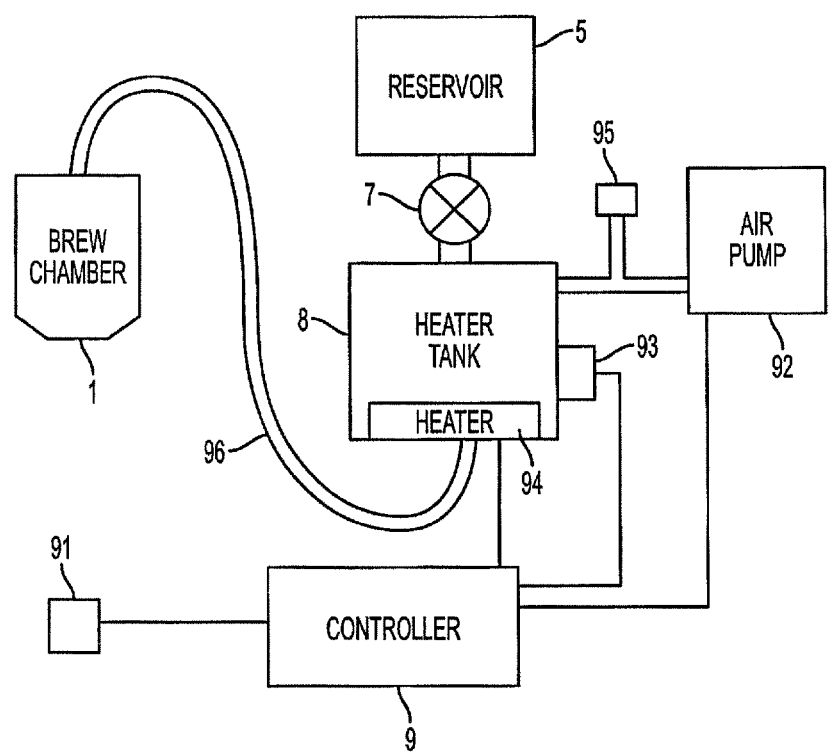
FIG. 6 is a schematic block diagram of a beverage formation device in accordance with aspects of the invention.

FIG. 6 shows a schematic diagram of a beverage forming device 10 in accordance with aspects of the invention, e.g., the device 10 shown in FIGS. 1-5. With water in the reservoir 5, the user may open the brew chamber 1 to provide a fresh cartridge 2 in the brew chamber 1, e.g., by lifting the handle 3, pressing a button that causes a motor-driven opening of the brew chamber 1, and so on. Opening of the brew chamber 1 causes the valve 7 to open, allowing water in the reservoir 5 to flow to the heater tank 8. As mentioned above, the valve 7 may open by way of a mechanical coupling of the valve 7 to a portion of the brew chamber 1 so that the valve opens with opening of the brew chamber 1, or by other arrangements such as a solenoid actuator causing the valve 7 to open based on a switch sensing opening of the brew chamber 1. If electronic or other sensing and motor-based operation of the valve 7 is used, the controller 9 may receive suitable sensor signals and output suitable drive signals to control the valve's 7 operation. Also, as mentioned above, the valve 7 may have a delay feature such that the valve 7 remains open for a period of time, 1-2 seconds, a few seconds, or more, after the brew chamber 1 is closed. Water may flow through the valve 7 to the heater tank 8 by gravity, air pressure in the reservoir 5, a pump, or any other suitable arrangement.

With water in the reservoir 5 delivered to the heater tank 8 by the open valve 7, the user may press a brew button (such the power button 91) to cause the brewer to start a brew cycle. In accordance with one aspect of the invention, initiation of a brew cycle may begin with heating of the water in the heater tank 8 by a heater 94 (e.g., an electrical resistance heater), and when the water is sufficiently heated, delivery of the water to the brew chamber may be initiated. Heating of the water in the heater tank 8 may be done in any suitable way. For example, a controller 9 may control the heater 94 to begin heating of the water in the heater tank 8, e.g., by an electrical resistance heater in or around the heater tank 8, a heater in the line 96 leading from the heater tank 8 to the brew chamber 1, or otherwise arranged to heat the water. Once the water is heated to a desired temperature, a thermal cut off (TCO) switch 93 associated with the heater tank 8 may open and cause power to be cut off to the heater 94, e.g., the TCO switch 93 may be arranged in the power supply line to the heater 94. (In some embodiments, sufficient heating of the water may be sensed in other ways, such as by a thermocouple, thermistor or other sensor.)

In accordance with an aspect of the invention, the controller 9 (e.g., which may include a microprocessor for performing data processing functions, a memory for storing data and/or operating instructions, communication buses or other devices, software or other computer-executable instructions, a power supply or other power source such as a plug for mating with an electrical outlet, relays, mechanical linkages, user data input devices such as buttons, a touch screen or other, information display devices such as an LCD display, indicator lights or other, and/or other components for providing desired control functions) may detect the opening of the TCO (such as by detecting a drop in voltage at the heater 94) and in response cause delivery of water to the brew chamber 1, e.g., control an air pump 92 to begin operation. The air pump 92 may deliver air under pressure to the heater tank 8 to cause the pressure in the heater tank 8 to rise, causing heated water to be forced from the heater tank 8 to the brew chamber 1 via a line 96. The heater tank 8 may have an outlet at or near the bottom of the heater tank 8 so that heated water is forced from the outlet and into the line 96 (which may include a check valve to help prevent backflow of fluid in the line 96). Heated water or other precursor liquid that is provided to the brew chamber 1 may enter a beverage cartridge 2 in the brew chamber 1 via an inlet needle that punctures the cartridge when the brew chamber lid 12 closes the brew chamber 1. The water may contact the beverage medium in the cartridge and a formed beverage may exit the cartridge, e.g., via an exit needle that punctures a bottom side of the cartridge. The air pump 92 may run for a specified period of time, e.g., 60 seconds, or otherwise controlled (e.g., by detecting a drop in pressure in the heater tank 8 signifying an absence of liquid) to empty the heater tank 8 of all water or other liquid. The timing of the air pump operation may be arranged so that mainly air is pumped at the end of the cycle, e.g., to help purge the cartridge 2 of any remaining beverage, as well as to help dry the heater tank 8 and the line 96.

As described above and in accordance with one aspect of the invention, the heater tank 8 may be vented to allow escape of steam or other pressurized gas during heating of the water, but not interfere with pneumatic delivery of water from the heater tank 8 to the brew chamber 1. For example, an orifice 95 (or valve) arranged in the connection between the air pump 92 and the heater tank 8 may be suitably arranged to properly vent the heater tank 8 during heating (e.g., to prevent substantial delivery of water from the heater tank 8 to the brew chamber 1 until the air pump 92 is operated), and be arranged so that pressurization of the heater tank 8 by the air pump 92 causes desired delivery of water to the brew chamber 1. In one illustrative embodiment, the orifice has a diameter of approximately 0.012 inch.

In one embodiment, the brewer may include a cup or mug sensor 97 that detects whether a container is positioned to receive a beverage as it exits the brew chamber 1 and cartridge. (In one embodiment, the cup sensor 97 may include an LED or other light emitting element and a photodetector that are arranged so that if a cup is properly positioned under the brew chamber, a light beam traveling from the LED to the photodetector is interrupted.) If a container is not detected, the controller 9 may prevent the brewer from operating, e.g., may prevent water heating, air pump operation, etc. Also, if the cup sensor detects that the container is removed during a brew cycle (e.g., during water heating or delivery of heated water to the cartridge), the controller 9 may stop brewer operation (stop heating or water delivery.) The brew cycle may be resumed if the container is detected to be replaced.

In another aspect of the invention, the controller 9 may include a feature that powers up the device 10 upon detection that the brew chamber 1 has been opened. In accordance with this aspect of the invention, a user need not be required to turn the device 10 on when seeking to make a beverage, e.g., by pressing the power button 91, but instead may simply lift the handle 3 or otherwise open the brew chamber 1 and place a new cartridge in the brew chamber 1. Upon closing of the brew chamber 1 (indicating that a new cartridge has been placed and water has been provided in the reservoir 5/heater tank 8), the controller 5 may begin the brew cycle (e.g., water heating, followed by water delivery to the brew chamber). The controller 9 may include one or more sensors to detect opening/closing of the brew chamber 1 and/or the reservoir lid 51 to power up the device 10 and/or initiate a brew cycle. Such sensors may include a microswitch that is opened/closed upon movement of the arm 42, the brew chamber lid 12, the reservoir lid 51, and/or other suitable components. Power up of the device 10 may be triggered, for example, by a switch detecting movement of the brew chamber lid 12 or arm 42 from the closed position toward the open position. The sensor(s) may alternately, or in addition, detect the presence of a cartridge in the brew chamber 1, water or other liquid in the reservoir 5 and/or other features for suitable control of the device 10. Accordingly, the device 10 may receive a brew indication from a user to start a brew cycle in a variety of different ways, e.g., by closing the reservoir lid 51, by pressing a power button 91 or other user input, by placing a cup or other receptacle under the brew chamber or otherwise to receive a beverage, and so on.

Figure 7:
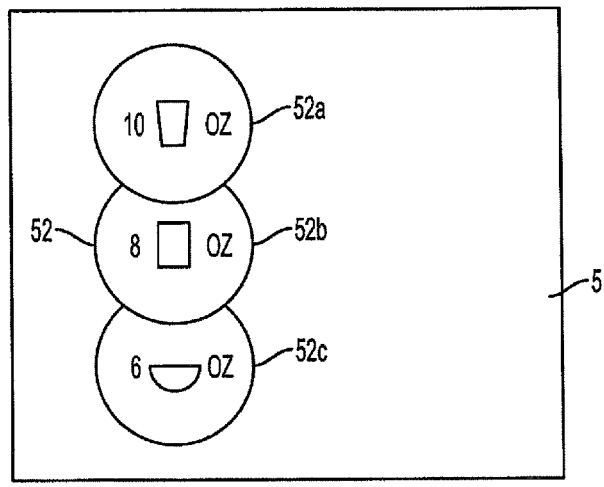
FIG. 7 shows a top view of a level indicator in an illustrative embodiment.
Figure 8:
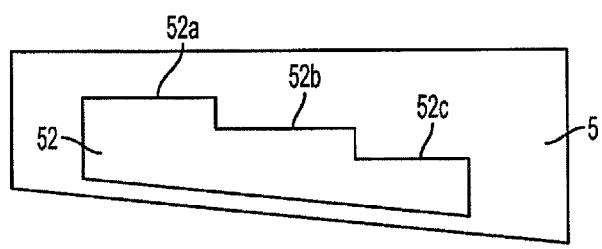
FIG. 8 shows a side view of the FIG. 7 level indicator embodiment.

FIGS. 7 and 8 show a top view and side view of another embodiment for a level indicator 52 for use with a reservoir 5. In this illustrative embodiment, the level indicator 52 includes a structure having a stepped arrangement such that three different volume indicators 52a, 52b, and 52c are provided in the reservoir 5. As water is provided into the reservoir 5 and the water level rises, the water level will first meet the indicator 52c, which in this embodiment indicates a volume of 6 ounces, although other volume indications are possible. If more water is added, the level will meet the second indicator 52b (representing 8 ounces in this embodiment), and then the third indicator 52c (which indicates 10 ounces). With this type of indicator 52, a user can relatively easily view the amount of liquid in the reservoir 5 by looking directly into the reservoir 5.

The above and other aspects of the invention will be appreciated from the detailed description and claims. It should be understood that although aspects of the invention have been described with reference to illustrative embodiments, aspects of the invention are not limited to the embodiments described. Also, aspects of the invention may be used alone, or in any suitable combination with other aspects of the invention.

The invention claimed is:

1. A method for forming a beverage, comprising:
   providing a beverage brewer that includes a brew chamber for receiving a beverage cartridge, a reservoir for holding beverage precursor liquid and a heating tank for heating beverage precursor liquid, the beverage brewer being constructed and arranged to introduce the precursor liquid into the beverage cartridge and form a beverage;
   providing beverage precursor liquid into the reservoir;
   opening of the brew chamber of the brewer to expose a cartridge receiver to receive a beverage cartridge in association with the brew chamber;
   in response to opening of the brew chamber, automatically opening a valve to permit beverage precursor liquid to flow from the reservoir into the heating tank;
   placing a beverage cartridge in the cartridge receiver;
   closing the brew chamber to at least partially enclose the beverage cartridge in the brew chamber; and
   in response to closing the brew chamber, automatically closing the valve to stop the flow of beverage precursor liquid from the reservoir to the heating tank.

2. The method of claim 1, further comprising:
   opening a lid of the reservoir before providing the beverage precursor liquid into the reservoir.

3. The method of claim 1, wherein the reservoir includes a volume indicator that visually indicates two or more different volumes of liquid held in the reservoir.

4. The method of claim 1, further comprising:
   operating the beverage brewer to empty the heating tank of precursor liquid to form a beverage.

5. The method of claim 1, wherein:
   the step of opening the brew chamber comprises opening a brew chamber lid to allow the beverage cartridge to be placed in the brew chamber; and
   the step of closing the brew chamber comprises closing the brew chamber lid.

6. The method of claim 5, wherein the valve includes a gate that is attached to the brew chamber lid and a flowpath, and wherein the valve moves with the brew chamber lid to close the flow path with the brew chamber lid in the closed position, and the valve moves with the brew chamber lid to open the flow path with the brew chamber in the open position.

7. The method of claim 1, further comprising:
   heating the beverage precursor liquid in the heating tank; and
   delivering the heated beverage precursor liquid to the beverage cartridge in the brew chamber.

8. The method of claim 7, wherein the step of delivering comprises introducing air into the heating tank to force the heated beverage precursor liquid to the beverage cartridge.

* * * * *